Dec. 23, 1947.      V. H. BORGELT        2,433,086
             TRACTOR LOADER MECHANISM
          Filed May 23, 1945      2 Sheets-Sheet 1

V. H. Borgelt  Inventor
By Arthur H. Sturges
              Attorney

Dec. 23, 1947.  V. H. BORGELT  2,433,086
TRACTOR LOADER MECHANISM
Filed May 23, 1945  2 Sheets-Sheet 2

Inventor
V. H. Borgelt
By Arthur H. Sturges
Attorney

Patented Dec. 23, 1947

2,433,086

UNITED STATES PATENT OFFICE 2,433,086

TRACTOR LOADER MECHANISM

Victor H. Borgelt, Wisner, Nebr.

Application May 23, 1945, Serial No. 595,432

5 Claims. (Cl. 214—140)

This invention relates to a material handling mechanism adapted to be attached to and supported by a tractor, and actuated by fluid under pressure, said pressure being applied by the engine of the tractor.

The general object of the invention is to provide an attachment of this character, which is strong and durable in construction, which is easy to operate and control, and which may be easily secured in an operative relation to any one of several small tractors of several well known types without any material alteration in the latter.

Another object of the invention is to provide a mechanism for the above stated purposes, whereby a tractor may carry a loading scoop, manure fork or the like and operate the same by power as regulated by one operator while driving the tractor, all controls being located within easy reach of the driver's seat.

A still further object of the invention is in the provision of double acting hydraulic means in connection with dual hydraulic lifting jacks for operating an excavating bucket or the like.

Another object of the invention is in the provision of a power loader having hydraulic lifting and bucket actuating means adapted to dig, carry, spread, level, lift and backfill dirt and other material which is commonly handled by an excavator loader.

An important object of the invention is to provide counter-balancing jacks on each side of a tractor and having an arrangement of parts such that when hydraulically actuated, the piston rods of the jacks move in one direction for pushing and the cylindrical housings of said pistons move in an opposite direction for exerting a pull, whereby the stress generated for moving a loaded bucket or the like upwardly is not applied to the frame of the tractor, and said double acting jacks, when actuated, move a loaded bucket upwardly rapidly, the construction being such that side sway of the loaded bucket is prevented, whereby accurate scooping and dumping operations are facilitated.

A further important object is to provide a construction so cooperatively assembled with said jacks that the cutting edge of a scoop employed is caused to be maintained in parallelism with the frame rails of the tractor, whereby all portions of said cutting edge are caused to be disposed evenly against the work, earth or the like during cutting and scooping operations.

Other objects and advantages of the invention will appear hereinafter, the accompanying drawings illustrating a preferred embodiment of the invention wherein.

As heretofore practiced, numerous mechanisms have been devised and attached to tractors for use in scooping, elevating and handling materials and in instances where said mechanisms have been hydraulically actuated, side sway of the scoop or forks have been resultant from said constructions, whereby operating costs have been proportionally and unnecessarily increased. Also, substantially all of said prior devices are so constructed that stress generated by an operation thereof is applied to the frame of the tractor and with the result that said frames have become distorted, the alignment of the differential gears and propelling mechanisms of the tractors injured resultant from said distortion, and the present invention aims to obviate certain of the undesirable features of the prior practice.

Figure 2:
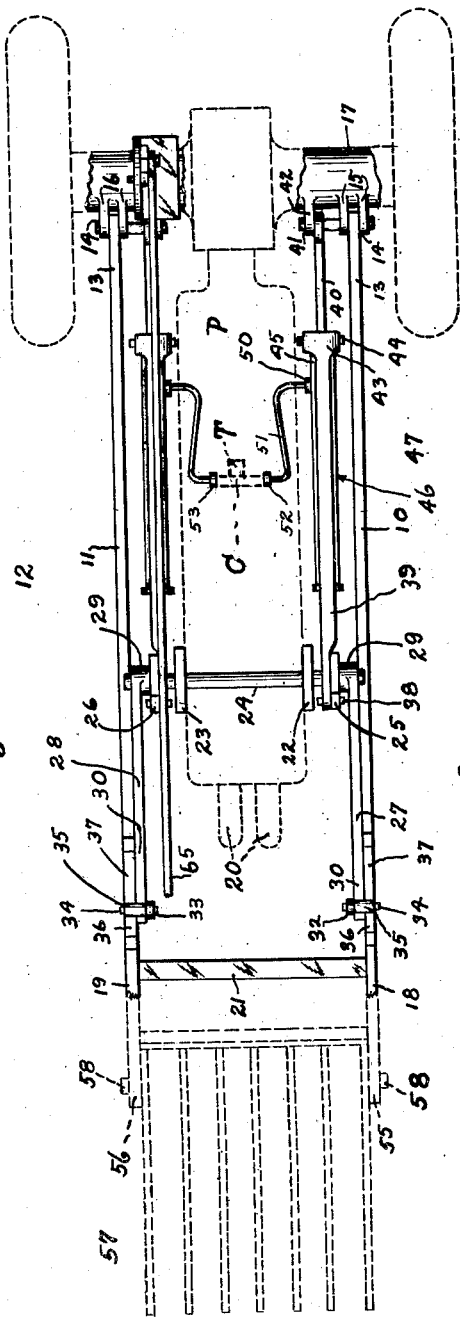
Figure 2 is a top plan view of the mechanism shown in Figure 1.

Referring now to the drawings for a more particular description and first to Figure 2, the present invention includes two like rails 10 and 11 which are oppositely disposed respectively at the sides of the tractor, the latter being generally indicated at 12. The tractor is illustrated by dotted lines throughout the several views since said tractor may be of any one of several conventional types and therefore believed to not require any particular description or illustration herein.

Figure 1:
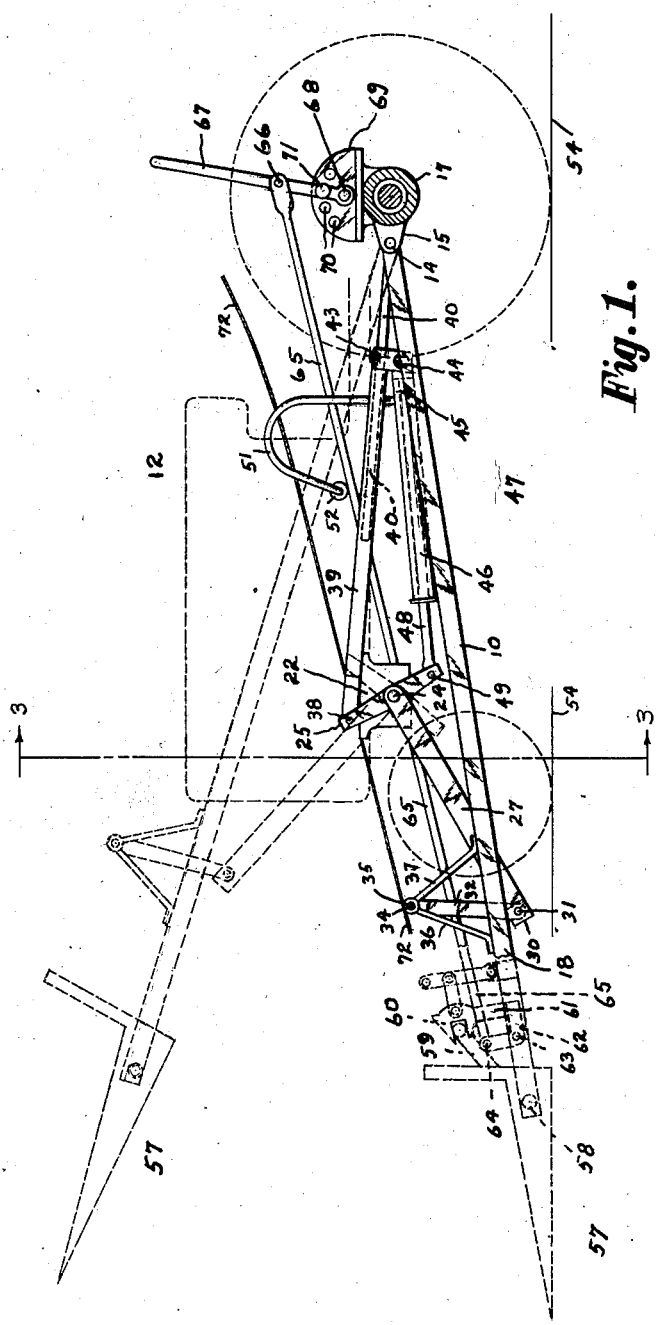
Figure 1 is a side elevation of the new device, certain portions thereof being broken away and others being represented by dotted lines, said device being depicted in an operative position with respect to a tractor, the latter being represented by dotted lines with the exception of its rear axle housing which is shown in cross section.

The ends 13 of the rails 10 and 11 are pivotally mounted on pivot-pins, as at 14, and between their respective pairs of ears 15 and 16. As shown in Figure 1, for convenience of illustration, the ears are formed integral with the rear axle housing 17 of the tractor 12, and it will be understood that, if desired, said ears may be secured to a strap (not shown) and the latter placed about and secured to said axle housing by any suitable means, such as draw bolts or the like, whereby the pairs of ears 15 and 16 are each rigidly secured to the housing 17 during use.

The other ends of the rails, indicated at 18 and 19 each extend, as best shown in Figure 2, forwardly of the front steering wheels 20 of the tractor, being secured together by means of a cross-bar 21, the latter having its ends secured to said rails.

Figure 3:
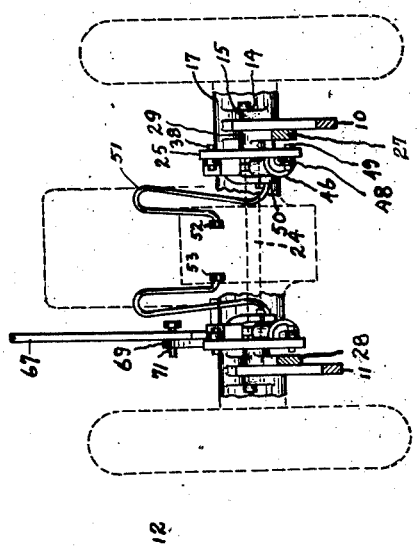
Figure 3 is a transverse vertical section thereof, the view being taken approximately on the line 3—3 of Figure 1 and looking in the direction of the arrows.

As shown in Figures 2 and 1, oppositely disposed hanger-brackets or trunnion-plates 22 and 23 are respectively secured to opposite sides of the frame of the tractor 12, said hanger-brackets not being shown in Figure 3. Any suitable means is employed for securing the hanger-brackets to the frame of the tractor and preferably bolts, not shown, are utilized, whereby said hanger-brackets may be readily attached to and removed from said frame.

A shaft 24 is journaled through said hanger-brackets or trunnion-plates as best shown in Figure 2. The shaft extends outwardly beyond each hanger-bracket for purposes later described.

Between the ends of the shaft 24 and the hanger-brackets, like bars 25 and 26 are each welded or otherwise rigidly secured to the shaft 24 so that the bars 25 and 26 will rotate in longitudinal planes with respect to the tractor. As shown in Figure 1, the shaft 24 extends through the medial portion of the member 25, whereby the half portions of the latter extend an equal distance outwardly from and at a right angle with respect to the shaft 24, said member 25 constituting a double crank-arm. It will be understood that the like member 26 is of the same construction and that the members 25 and 26 are disposed in horizontal alignment with respect to each other.

As best shown in Figure 2, the mechanism further includes a pair of oppositely disposed interconnecting arms 27 and 28, the rearwardly disposed ends of which are provided with like hubs 29. The hubs are also welded, keyed to, or otherwise rigidly secured to the shaft 24 and preferably said hubs and their respective arms are formed integral with or welded to the other portions of their respective members 25 and 26. Since the arm 27 is locked to its crank 25, said arm and crank provide a member of T-shape in plan, the elongated arm 27 providing the main body portion or trunk and the crank 25 the head of the T, said member being cruciform in plan and more particularly and preferably in the form of a tau cross.

The forward ends 30 of the trunk portions 27 and 28 are respectively pivotally connected, as at 31, to links 32 and 33, as best shown in Figure 1. The links are approximately vertically disposed at the time the rails 10 and 11 are in a lowered position. The upper ends of the links are each provided with a pivot-pin such as the pins 34.

The pins 34 extend through bushings 35. The bushings are each supported above the rails by means of a set of brace-bars 36 and 37.

The brace-bars have upper ends which are welded to the bushings. The bars 36 and 37 of each set are disposed divergently from the bushings and downwardly, having lower ends which are respectively welded or otherwise suitably secured to the rails.

As best shown in Figure 2 a pin 38 is disposed through the upper portion of the double crank-arm 25 whereby a pivotal connection is provided with a pull-link 39. The main body portion of the member 39 is preferably hollow and rectangular in cross section for telescopically receiving therein a guide-rod 40 the latter having an end adjacent to the rear axle housing 17 which is pivotally connected, as at 41, and in operative effect, is secured to the rear axle housing 17 in the same manner, preferably, as the pairs of ears 15 for purposes later described. Preferably the pivotal connection between the rear axle housing and the guide rods includes the same pivot-pins respectively carried by the above mentioned pairs of ears 15 and 16.

In transverse section the guide-rod 40 is also rectangular for a sliding fit snugly within the major portion of the pull-link 39 as best shown by dotted lines in Figure 1, whereby there is a sliding connection between the guide rod and said pull-link 39.

The rearwardly disposed end of the pull-link 39 is provided with a downwardly disposed bifurcated end portion 43 which, as best shown in Figure 1, is provided with a pivot-pin 44. The latter extends through the said bifurcations.

The pin 44 provides a pivotal connection with the rearwardly disposed end 45 of a cylinder 46 the latter being a part of an hydraulically actuated jack. The latter is generally indicated at 47.

A piston rod 48 is slidably disposed with respect to the cylinder 46, said rod having an end disposed outwardly of the cylinder, said end, as best shown in Figure 1, is pivotally attached, as at 49, to the lower portion of the double crank-arm 25.

As best shown in Figure 2 adjacent the rear end 45 of the jack-cylinder 46 a connector 50 is provided for a flexible hose 51 the latter having an intake end 52.

It will be understood that, as best shown in Figure 2, a like jack is provided at the other side of the tractor, together with a duplication of the above identified parts numbered 38 through 51 and that the flexible hose or conduit for the mechanism at said other side of the tractor is provided with an intake or connector 53.

There is a suitable connection between the said intakes 52 and 53 such as the dotted line pipe C which includes a branch T for providing communication with the pump of the tractor.

The pump (not shown) is of a conventional type common to most all modern tractors, the construction thereof being such that at the time the operator manipulates a valve, oil or fluid under pressure is provided by said pump and in the practice of the present invention said pressure is supplied to the intake ends 52 and 53 and to their respective jacks. The pump is generally indicated at P.

As thus described it will be seen that at times when oil under pressure is supplied to the rear ends of the cylinders of the said pair of jacks, between the closed rear end walls of the cylinders and the piston heads or ends of the rods 48 within said cylinders, that said pressure causes said cylinders to move toward the rear axle housing 17 of the tractor thereby causing the pull-links to move the upward ends of the double cranks correspondingly. It will also be seen that simultaneously said pressure causes the piston rod 48 to move forwardly, together with its oppositely disposed mate, and away from the rear axle housing 17 for moving the lower ends of said double-cranks forwardly equally with respect to a rearward movement of the upper half of each double crank, since the pivot pins 38 and 49 are equidistant from the shaft 24.

Since the arms 27 and 28 are disposed in horizontal alignment with respect to each other and since the force applied to said arms in two directions is uniform, said arms 27 and 28 become swung and the motion is applied to the links 32 and 33 which causes the rails 10 and 11 to become moved upwardly from their lowered position, as shown by the full lines in Figure 1, to their dotted line elevated position as shown in said figure.

The operator by opening and closing the above mentioned valve may selectively cause the rails 10 and 11 to move upwardly to a desired extent and also to be maintained in a selected upward position above the ground, the surface of the latter being represented by lines 54 in Figure 1.

The mechanism is so constructed and the parts thereof are so arranged with respect to each other that said jacks are double acting, since each jack applies a push in one direction and a pull in a diametrically opposite direction, whereby the stress occasioned by a moving of the rails 10 and 11 upwardly, at the time when said rails support a heavy load, is not applied to the frame of the tractor.

The extreme forward ends of the rails 10 and 11 are respectively indicated at 55 and 56, said ends being depicted by dotted lines together with adjunct mechanism now to be outlined.

Between said ends 55 and 56 a scoop or the like generally indicated at 57 is provided. The oppositely disposed side walls of the scoop are respectively pivotally mounted, as at 58, to the ends 55 and 56 of the rails 10 and 11 and means are provided for adjusting the angle of inclination of the bottom of the scoop with respect to said rails.

As shown in Figure 2 the scoop 57 is in the form of a fork having a plurality of tines.

To the rear wall or backstop of the scoop or fork a bar 59 is secured as shown by dotted lines in Figure 1. The medial portion of the bar is engaged at times, with a detent 60, the latter having a bifurcated medial portion for receiving the bar 59 between said bifurcations. The detent 60 is provided with an elongated shank 61 which is attached to an arm of a bell-crank lever 62.

The bell-crank is pivotally attached, as at 63, to the rail 11 and the upwardly disposed arm of the bell-crank is pivotally attached, as at 64, to a reach-rod 65.

The reach-rod extends rearwardly and its rear end is pivotally attached, as at 66, to a hand lever 67. The latter has a lower end pivotally secured, as at 68, to a sector-disc 69 the latter being attached, by any suitable means, to the rear axle housing 17 of the tractor. It will be understood that the pivot pin 68 for the hand lever 67 may be, if desired, the pivot-pin of the pair of ears 16 and that the sector 69 may be secured to the adjacent rail 11 whereby the lever 67 and the sector 69 swing with the rail in lieu of being connected to the axle housing 17, said parts being depicted as shown in the drawings for convenience of illustration.

The member 69 is provided with an arcuate row of spaced apart apertures 70 and a keeper-pin 71 is disposed through the lever 67 and a selected one of the apertures 70 for maintaining a selected degree of inclination of the scoop 57 with respect to the rails 10 and 11.

Since the scoop 57, the reach-rod 65 and its adjunct mechanism may be of any conventional type if desired, a more particular description and illustration thereof is believed to be not needed.

In operation the machine is caused to move forwardly, the scoop at this time being in a lowered position so that its forward cutter edge is close to the surface 54, whereby the scoop becomes filled with material such as sand, earth or the like. It will be seen that since the shaft 24 is disposed in parallelism with respect to the parallel frame rails of the tractor 12 and since the rails 10 and 11 of the new device are not permitted to sway sidewise, that the forward cutting edge of the scoop 57 is also maintained in parallelism with the frame rails of the tractor, whereby at the time the scoop is forced into the soil or work the whole longitudinal cutting edge of the scoop contacts said work and the scoop loads evenly in lieu of at one side only as heretofore. After the scoop becomes filled, the above mentioned valve is opened and the engine of the tractor caused to pump oil under pressure to the jacks, as above described, for causing the rails 10 and 11 to ascend for many desired utilitarian purposes including an elevation of the loaded scoop.

When elevated the said valve is closed during a traveling movement of the machine to a site for a deposit of said material whereupon the rope 72 is manipulated for tripping the detent 60 for permitting the forward end of the scoop to swing downwardly, whereby the load becomes dumped on said site.

Between the trunnion-plate or hanger bracket 22 and the adjacent side of the double-crank 25 a washer (not shown) is placed about the shaft 24 for filling the space between said crank and plate and a similar washer is similarly disposed at the other side of the tractor, whereby longitudinal sliding movements of the shaft 24 is prevented for preventing side sway of the rails 10 and 11. In instances where the distance between the sides of the frame of the tractor is sufficient said washers are not employed. The said washers are omitted from the drawings for convenience of illustration and dowel pins may be employed in lieu of said washers if desired.

Among other advantages of the instant construction and cooperative arrangement of parts it is believed pertinent to mention that any given pressure provided by the engine and pump of the tractor when applied to a cylinder of a jack of the present invention is multiplied twofold since the end wall of said cylinder is moved in one direction by said pressure and the latter equally moves the piston rod of the jack in an opposite direction, said pressure being doubled since the area in plan of the end of the piston rod is equal to the area in plan of the inside surface of the end wall of the cylinder. By this means jacks of comparatively small size or bulk and of light weight can be employed which is of advantage for use in connection with tractors having a small amount of room between their rear traction wheels and the sides of their frames.

From the foregoing description, it is thought to be obvious that a tractor mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish it to be understood as limiting myself to the precise arrangement and formation of the several parts herein shown in carrying out my invention in practice, except as claimed.

I claim:

1. In a material handling mechanism; a tractor having a pump for providing oil under pressure; trunnion-plates secured at opposite sides of and to the frame of said tractor; a shaft rotatably carried by said plates; a member approximately cruciform in plan for each plate, the heads of said members being respectively secured to the ends of said shaft midway between the ends of said heads, the free ends of the trunks of said crosses being disposed for vertical swinging movement; a rail at each side of said tractor; pivot-pins for respectively connecting ends of said rails to the rear axle housing of said tractor; two pull-links having ends respectively pivotally connected to an end of the head of each cross; two hydraulic jacks each having a cylinder and a piston rod, ends of said rods being respectively pivotally connected to the other ends of the heads of said crosses, the other ends of said rods being respectively slidably disposed through ends of said cylinders, the other ends of said cylinders being respectively pivotally connected to the other ends of said pull-links; and two guide-rods having ends respectively pivotally mounted on said pivot-pins, the other ends of said guide-rods respectively having a sliding connection with said pull-links; the said free ends of the trunks of said crosses being respectively pivotally connected to the other ends of said rails, said cylinders being in communication with said pump for applying oil under pressure to said piston rods, whereby a push is applied to one end of said heads and a pull to the other ends thereof for swinging the free ends of the trunks of said crosses and rails vertically during operation.

2. In a material handling mechanism; a tractor having an oil pump for providing hydraulic pressure; a rail disposed at each side of said tractor, said rails having ends pivotally connected to the rear axle housing of the tractor; cruciform members pivotally connected to the frame of said tractor, said members having portions respectively pivotally connected to the other ends of said rails; and hydraulically actuated means governed by said pump for applying a push and pull force to said members for correspondingly moving said other ends of said rails.

3. In a material handling mechanism, a tractor having a pump, a rail having an end pivotally connected to the rear axle housing of the tractor for movement in a vertical plane, a cruciform member pivotally connected to the frame of said tractor, said member having a portion secured to the other end of said rail and hydraulically actuated means governed by said pump, for applying push and pull forces to said member for swinging the other end of said rail.

4. In a material handling mechanism; a tractor having a pump for providing hydraulic pressure; a rail disposed at each side of said tractor, said rails having ends pivotally connected to the rearward end of the tractor; a pair of bars each disposed at opposite sides of said tractor and each pivotally attached to the forward end of said tractor at a point between its ends so that said bars are adapted to rotate in longitudinal planes with respect to said tractor; interconnecting means respectively attached to each of said bars and pivotally secured to respective ones of said rails so that when said bars are caused to pivot the forward ends of said rails will define upward and downward motions; and hydraulically actuated means governed by said pump for applying a push and pull force to the respective ends of said bar for correspondingly moving the forward ends of said rails.

5. In a material handling mechanism; a tractor having a pump for providing hydraulic pressure; a rail disposed at each side of said tractor, said rails having ends pivotally connected to the rearward ends of the tractor; a pair of bars each disposed at opposite sides of said tractor and each pivotally attached to the forward end of said tractor at a point between its ends so that said bars are adapted to rotate in longitudinal planes with respect to said tractor; interconnecting means respectively attached to each of said bars and pivotally secured to respective ones of said rails so that when said bars are caused to pivot the forward ends of said rails will define upward and downward motions; two pull links having ends each respectively pivotally attached to an end of each of said bars; two hydraulic jacks each having a cylinder and a piston rod, ends of said rods being respectively pivotally connected to the other ends of each of said bars, the other ends of said rods being respectively slidably disposed through ends of said cylinders, the other ends of said cylinders being respectively pivotally connected to the other ends of said pull links; and two guide-rods having ends respectively mounted on the rearward end of said tractor, the other ends of said guide-rods respectivley having a sliding connection with said pull links; said cylinders being in communication with said pump for applying oil under pressure to said piston rods, whereby a push is applied to one end of said bar and a pull to the other end of said bar for swinging the forward ends of said rails upwardly during operation.

VICTOR H. BORGELT.

REFERENCES CITED

The following references are of record in the file of this patent:

UNITED STATES PATENTS

| Number | Name | Date |
|---|---|---|
| 2,067,879 | Whitmire | Jan. 12, 1937 |
| 2,126,791 | Low | Aug. 16, 1938 |
| 2,254,292 | Jones | Sept. 2, 1941 |
| 2,268,689 | Andrus | Jan. 6, 1942 |
| 2,286,947 | Bankson | June 16, 1942 |
| 2,313,534 | Gledhill | Mar. 9, 1943 |
| 2,319,921 | Dooley et al. | May 25, 1943 |
| 2,332,742 | Mott | Oct. 26, 1943 |
| 2,363,986 | Mott | Nov. 28, 1944 |
| 2,392,025 | Craig | Jan. 1, 1946 |